US006289776B1

(12) United States Patent
Altstadt et al.

(10) Patent No.: US 6,289,776 B1
(45) Date of Patent: Sep. 18, 2001

(54) METHOD AND APPARATUS FOR MACHINING BEARING HOUSING

(75) Inventors: Nicholas John Altstadt, Sidney; Gary Joseph Diller, Coldwater, both of OH (US)

(73) Assignee: Copeland Corporation, Sidney, OH (US)

( * ) Notice: Subject to any disclaimer, the term of this patent is extended or adjusted under 35 U.S.C. 154(b) by 0 days.

(21) Appl. No.: 09/346,837

(22) Filed: Jul. 2, 1999

(51) Int. Cl.$^7$ ...................................................... B23B 3/00
(52) U.S. Cl. .............................. 82/1.11; 279/110; 279/133
(58) Field of Search ...................... 418/55.1; 29/888.022; 408/1 R; 82/1.11; 279/110, 133, 156

(56) References Cited

U.S. PATENT DOCUMENTS

| | | | |
|---|---|---|---|
| 4,709,512 | * | 12/1987 | Okubo et al. ....................... 51/237 R |
| 4,767,293 | * | 8/1988 | Caillat et al. ............................ 418/55 |
| 4,930,955 | * | 6/1990 | Kawano et al. ....................... 279/110 |
| 5,102,316 | * | 4/1992 | Caillat et al. ........................ 418/55.5 |
| 5,156,539 | * | 10/1992 | Anderson et al. .................. 418/55.4 |
| 5,267,844 | * | 12/1993 | Grassbaugh et al. ............ 417/410 R |
| 5,292,139 | * | 3/1994 | Gaillard ................................ 279/110 |
| 5,320,506 | * | 6/1994 | Fogt ..................................... 418/55.3 |
| 5,558,444 | * | 9/1996 | Ide ....................................... 384/122 |
| 5,711,196 | * | 1/1998 | Reid et al. ............................. 82/1.11 |
| 6,089,758 | * | 7/2000 | Ward ................................... 384/537 |

FOREIGN PATENT DOCUMENTS

2091601 * 8/1982 (GB) ................................... 279/110

* cited by examiner

*Primary Examiner*—A. L. Wellington
*Assistant Examiner*—Monica S. Carter
(74) *Attorney, Agent, or Firm*—Harness, Dickey & Pierce, P.L.C.

(57) ABSTRACT

A scroll machine has a shell which houses a first scroll member, a second scroll member, a driving member and a bearing housing. The bearing housing rotatably supports the driving member and is attached to the shell. The bearing housing is designed such that it can be fully machined while being located and clamped into a single position. By completing the entire machining of the bearing housing in a single operation, multiple set-ups, multiple operations and tolerance stack up are eliminated creating a high quality component.

12 Claims, 7 Drawing Sheets

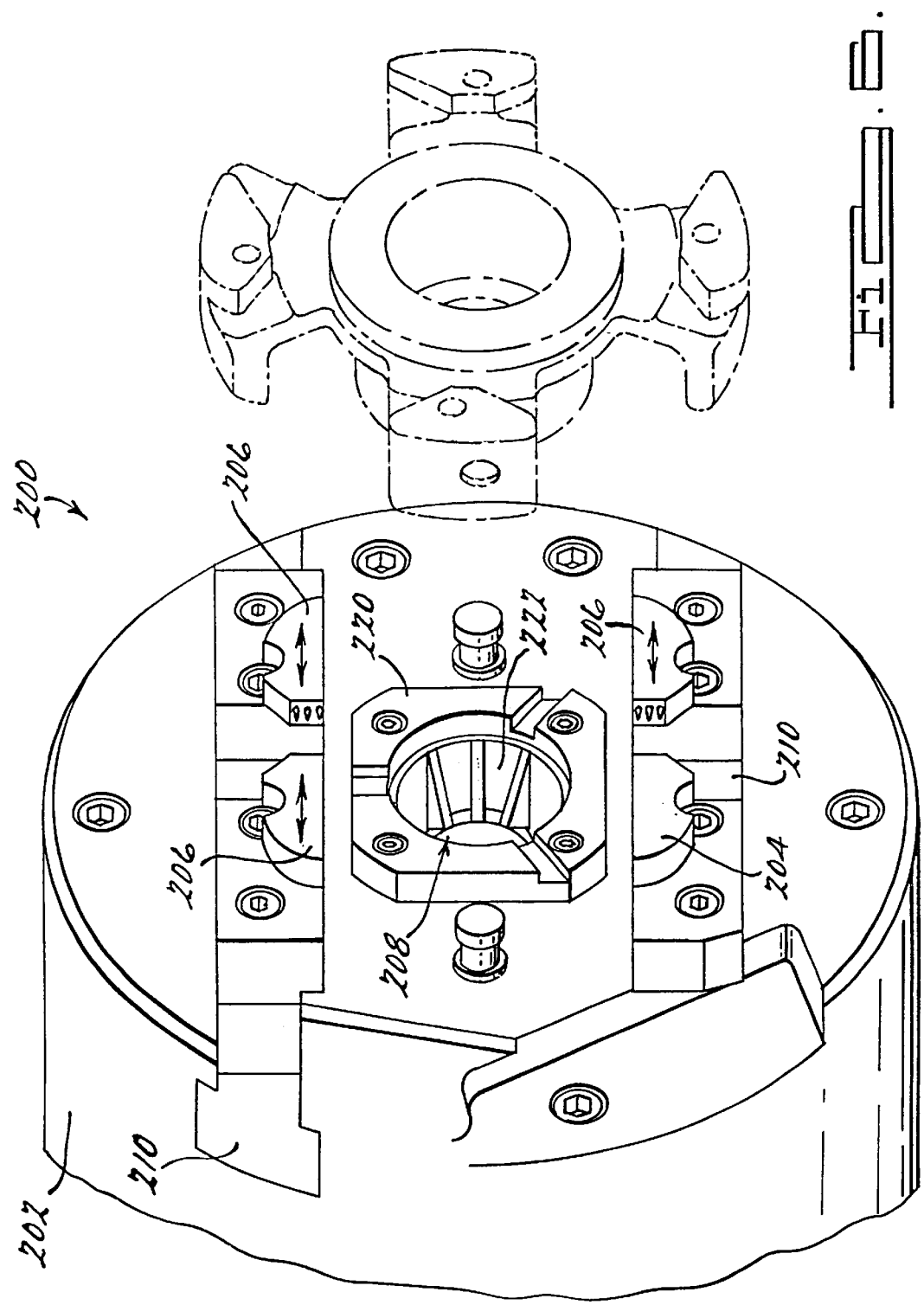

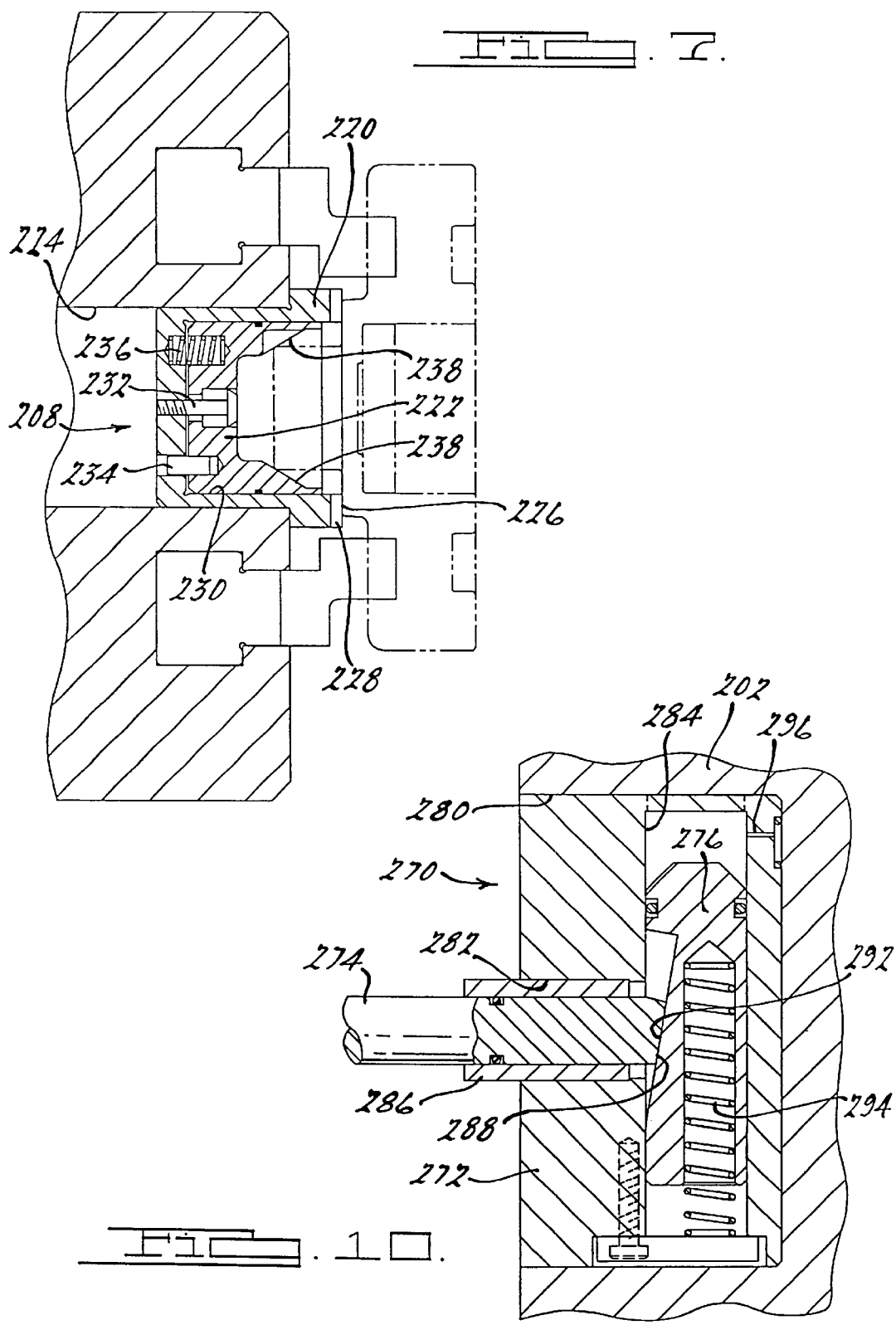

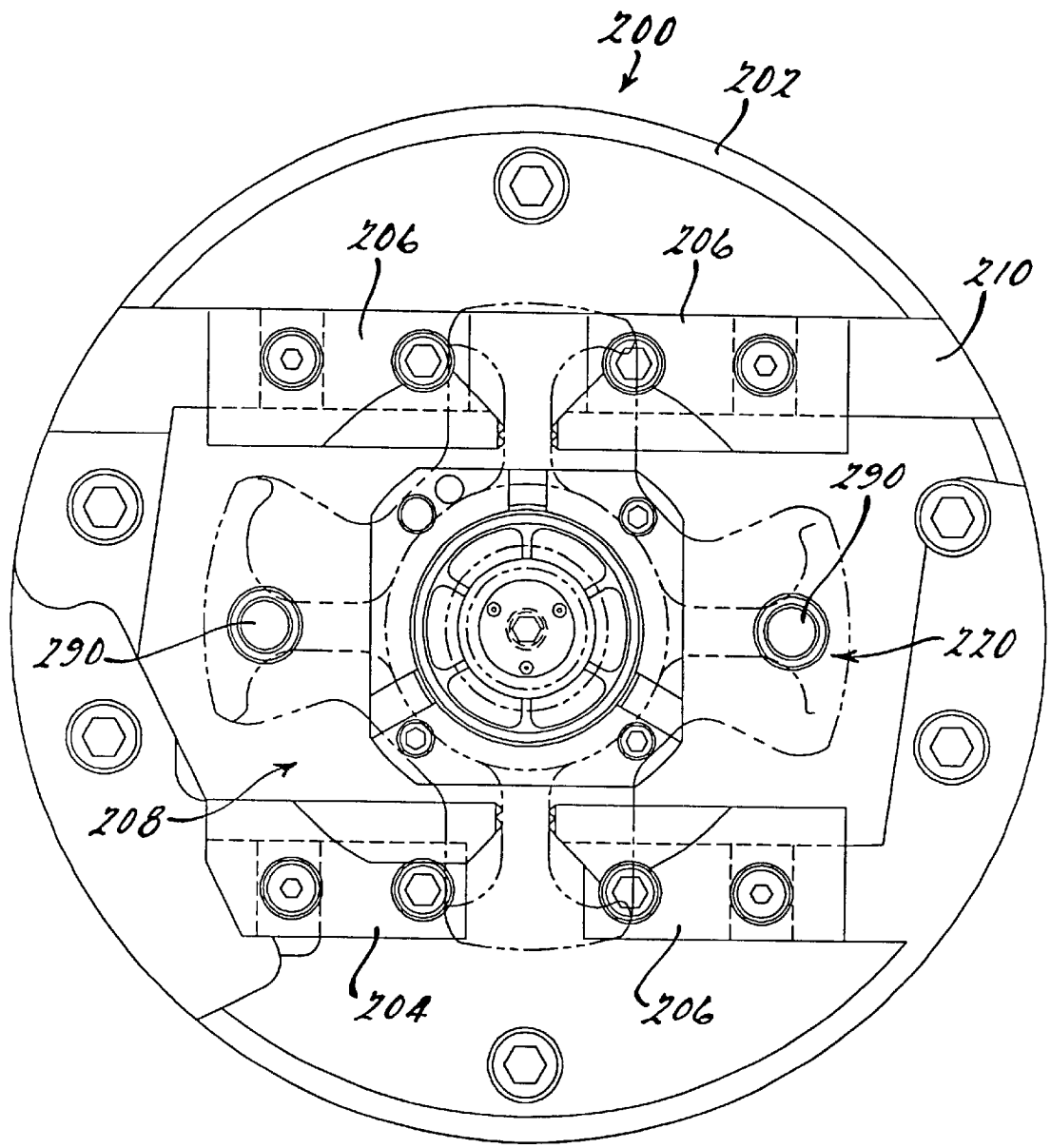

US 6,289,776 B1

METHOD AND APPARATUS FOR MACHINING BEARING HOUSING

FIELD OF THE INVENTION

The present invention relates to scroll machines. More particularly, the present invention relates to scroll compressors having a bearing housing which is designed to be totally machined while being located and retained in a single machining center thus eliminating multiple machines and machine set-ups for the machining of the bearing housing.

BACKGROUND AND SUMMARY OF THE INVENTION

Scroll type machines are becoming more and more popular for use as compressors in both refrigeration as well as air conditioning applications due primarily to their capability for extremely efficient operation. Generally, these machines incorporate a pair of intermeshed spiral wraps, one of which is caused to orbit relative to the other so as to define one or more moving chambers which progressively decrease in size as they travel from an outer suction port toward a center discharge port. An electric motor is provided which operates to drive the orbiting scroll member via a suitable drive shaft affixed to the motor rotor. In a hermetic compressor, the bottom of the hermetic shell normally contains an oil sump for lubricating and cooling purposes.

Scroll compressors depend upon a number of seals to be created to define the moving or successive chambers. One type of sealing which must be created is the sealing between opposed flank surfaces of the wraps. This flank sealing is created as a line seal adjacent to the outer suction port and the line seal travels radially inward along the flank surface due to the orbiting movement of one scroll with respect to the other scroll. Additional sealing is required between the end plate of one scroll and the tip of the wrap of the other scroll. Axial biasing of one scroll with respect to the other urges the tips of the wraps into engagement with the opposite end plate to enhance the sealing between the tip and the end plate.

The orbital movement of one scroll with respect to the other can be accomplished by having an electric motor drive on one of the scrolls. The electric motor normally includes a motor stator which is secured within a shell. A motor rotor and drive shaft are located within the motor stator for rotation with respect to the motor stator. A lower bearing housing and an upper bearing housing which are secured to the shell, rotatably support the drive shaft and the motor rotor within the motor stator.

The upper or main bearing housing includes a bore which locates a bearing which rotatably supports the shaft. The upper surface of the main bearing housing acts as a thrust surface for one of the scroll members and thus forms a reaction surface for the biasing load being exerted on this scroll member by the opposite scroll member. The multi-function role of the main bearing housing requires extensive and precision machining of the bearing housing to ensure its proper function within the compressor.

Prior art main bearing housings were machined using multiple machines and multiple setups. First, the hub portion of the main bearing housing was machined on its exterior surface and possibly a portion of its interior surface. This machining then provided a locating point for the remainder of the machining. The main bearing housing would be removed from the first machine after the first operation and transferred to a second machine using the first machined surface as a locating surface. The remainder of the machining was then performed on the main bearing housing. The multiple machines and multiple setups required for the machining of the prior art main bearing housing added costs and complexities to the production of the main bearing housing and thus the compressor.

The present invention provides the art with a scroll compressor which incorporates a main bearing housing that can be totally machined from one set up. This single set up machining eliminates a large portion of the tolerance stack-up as well as a significant amount of machining. This single set up also eliminates the problems associated with multiple machining operations and the multiple set ups for the main bearing housing. The elimination of machining set ups and the elimination of machining operations significantly decreases both the manufacturing complexities and the manufacturing costs for the main bearing housing and the scroll compressor while simultaneously providing a more accurate finish product.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 6 is a perspective view illustrating the clamping mechanism used to manufacture the main bearing housing shown in FIG. 2;

FIG. 7 is a cross-sectional side view of the clamping mechanism shown in FIG. 5;

FIG. 8 is an end view of the clamping mechanism shown in FIG. 6;

FIG. 10 is a cross-sectional view of the clamp support system for the damping mechanism shown in FIG. 6.

DETAILED DESCRIPTION OF THE PREFERRED EMBODIMENT

Figure 1:
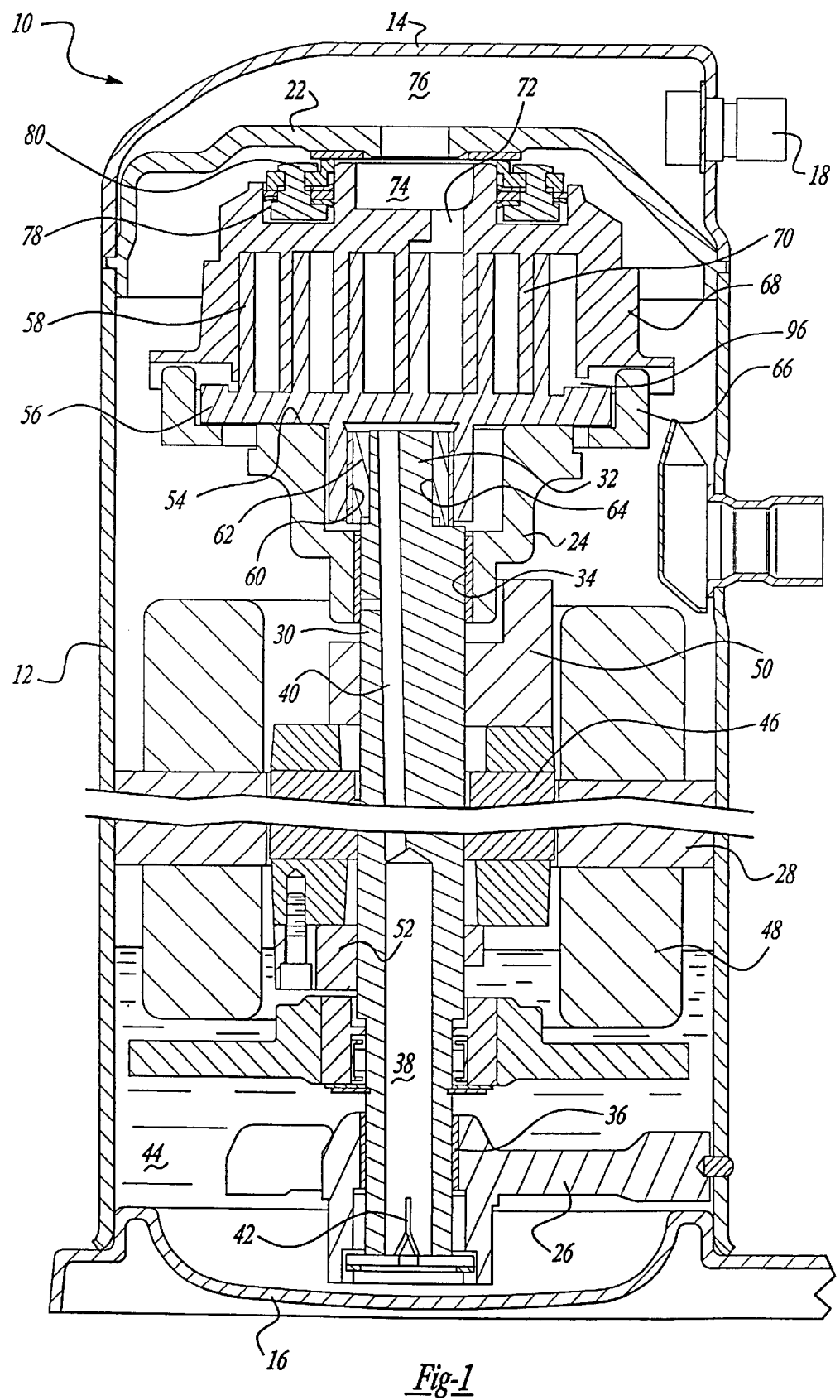
FIG. 1 is a vertical cross-sectional view through the center of a scroll type refrigeration compressor incorporating a main bearing housing in accordance with the present invention.
Figure 2:
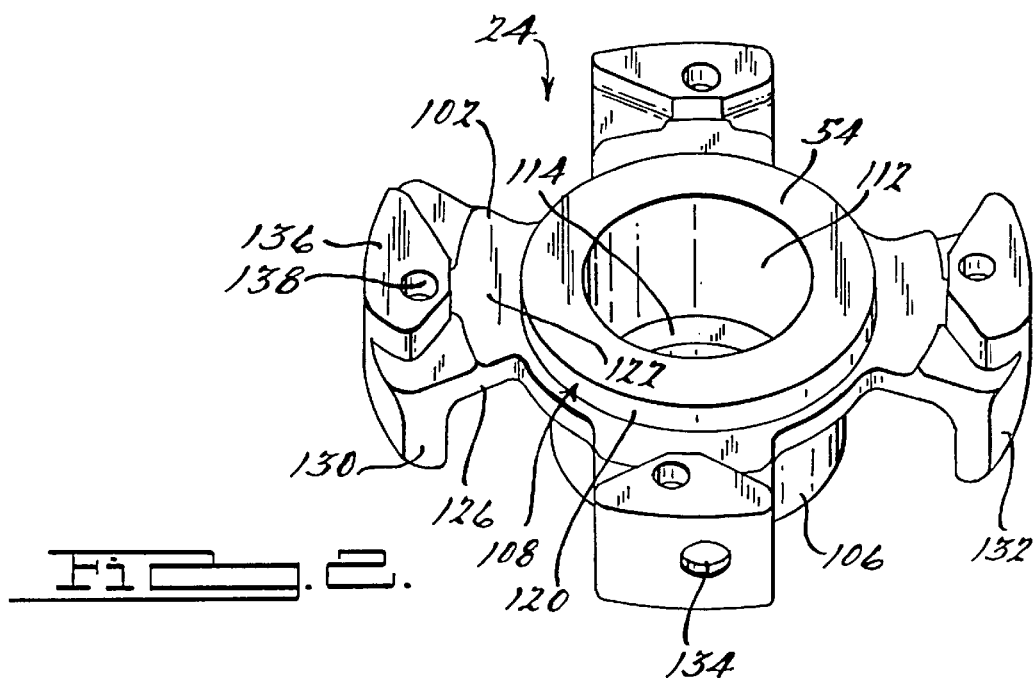
FIG. 2 is a perspective view of the main bearing housing illustrated in FIG. 1.
Figure 3:
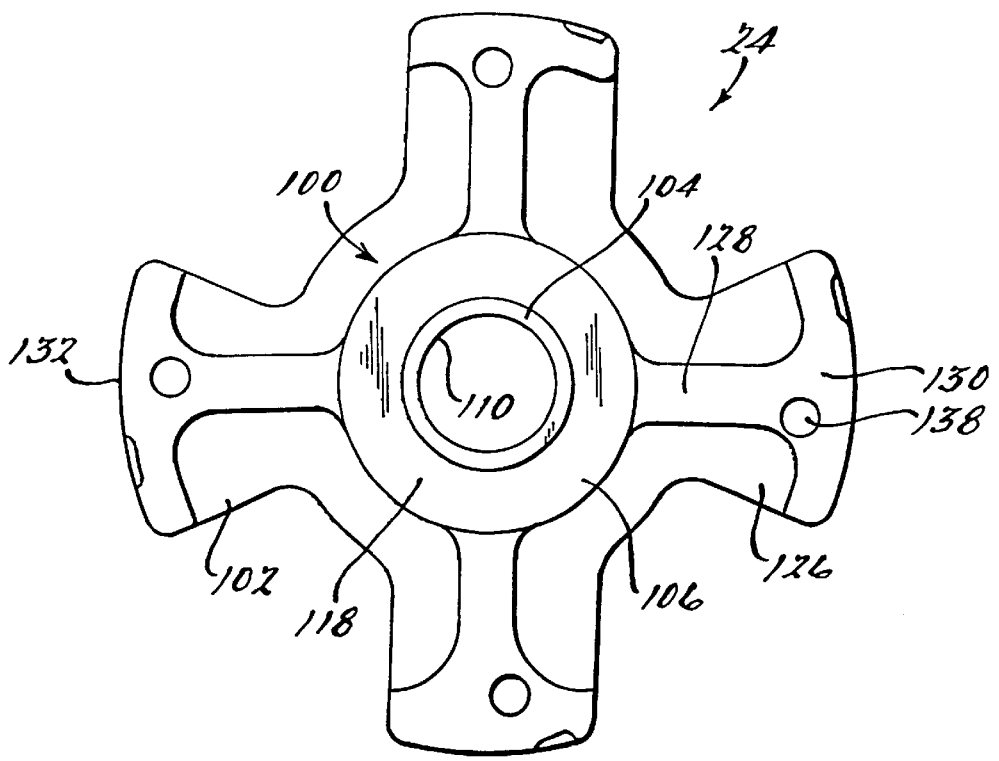
FIG. 3 is a bottom plan view of the main bearing housing illustrated in FIG. 2.
Figure 4:
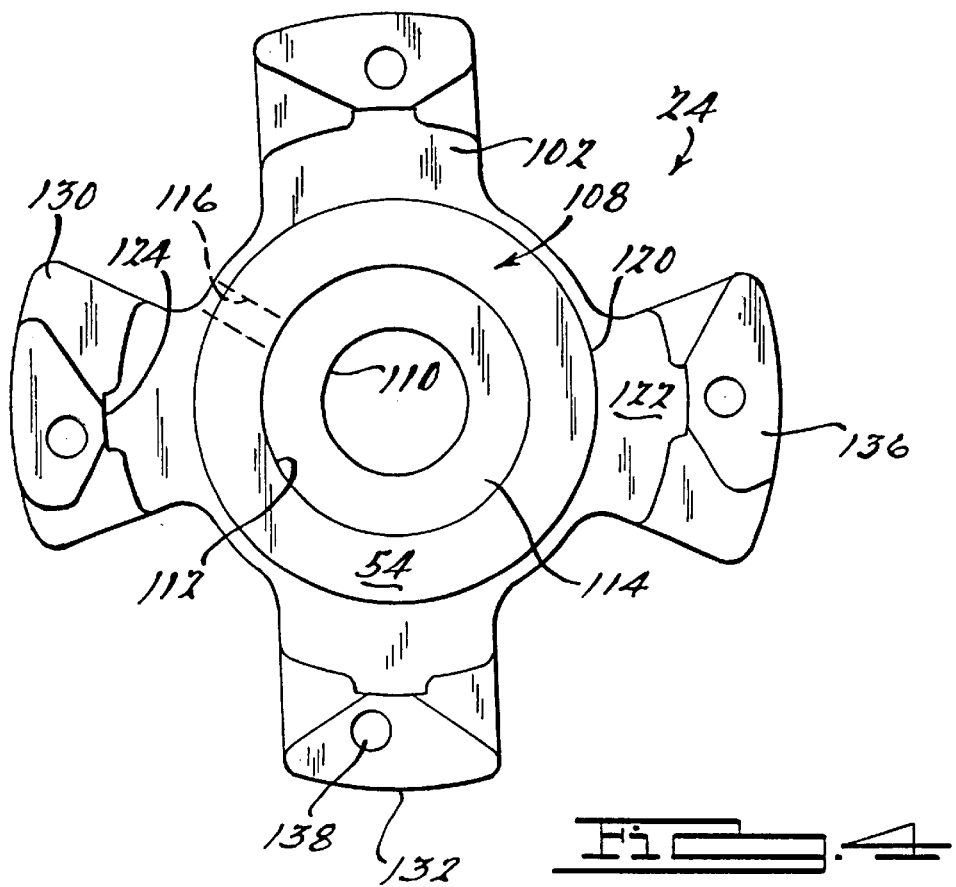
FIG. 4 is a top plan view of the main bearing housing illustrated in FIG. 2.
Figure 5:
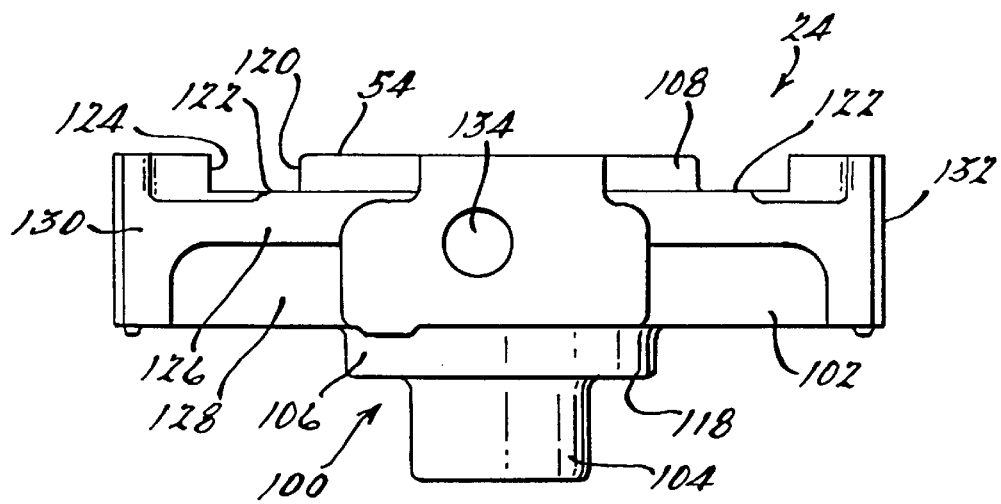
FIG. 5 is a side view of the main bearing housing illustrated in FIG. 2.

Referring now to the drawings in which like reference numerals designate like or corresponding parts throughout the several views, there is shown in FIG. 1 a scroll compressor which incorporates the main bearing housing in accordance with the present invention which is designated generally by reference numeral 10. Compressor 10 comprises a generally cylindrical hermetic shell 12 having welded at the upper end thereof a cap 14 and at the lower end thereof a base 16 having a plurality of mounting feet (not shown) integrally formed therewith. Cap 14 is provided with a refrigerant discharge fitting 18 which may have the usual discharge valve therein (not shown). Other major elements affixed to the shell include a transversely extending partition 22 which is welded about its periphery at the same point that cap 14 is welded to shell 12, a main bearing housing 24 having a plurality of radially outwardly extending legs which are each suitably secured to shell 12 and a lower bearing housing 26 also having a plurality of radially outwardly extending legs each of which is also suitably secured to shell 12. A motor stator 28 which is generally square in cross-section but with the corners rounded off is press fitted into shell 12. The flats between the rounded corners on the stator provide passageways between the stator and shell, which facilitate the return flow of lubricant from the top of the shell to the bottom.

A drive shaft or crankshaft 30 having an eccentric crank pin 32 at the upper end thereof is rotatably journaled in a bearing 34 in main bearing housing 24 and a second bearing 36 in lower bearing housing 26. Crankshaft 30 has at the lower end a relatively large diameter concentric bore 38 which communicates with a radially outwardly inclined smaller diameter bore 40 extending upwardly therefrom to the top of crankshaft 30. Disposed within bore 38 is a stirrer 42. The lower portion of the interior shell 12 defines an oil sump 44 which is filled with lubricating oil to a level slightly above the lower end of a rotor 46, and bore 38 acts as a pump to pump lubricating fluid up the crankshaft 30 and into passageway 40 and ultimately to all of the various portions of the compressor which require lubrication.

Crankshaft 30 is rotatively driven by an electric motor including stator 28, windings 48 passing therethrough and rotor 46 press fitted on the crankshaft 30 and having upper and lower counterweights 50 and 52, respectively.

The upper surface of main bearing housing 24 is provided with a flat thrust bearing surface 54 on which is disposed an orbiting scroll member 56 having the usual spiral vane or wrap 58 on the upper surface thereof. Projecting downwardly from the lower surface of orbiting scroll member 56 is a cylindrical hub having a journal bearing 60 therein and in which is rotatively disposed a drive bushing 62 having an inner bore 64 in which crank pin 32 is drivingly disposed. Crank pin 32 has a flat on one surface which drivingly engages a flat surface (not shown) formed in a portion of bore 64 to provide a radially compliant driving arrangement, such as shown in assignee's U.S. Pat. No. 4,877,382, the disclosure of which is hereby incorporated herein by reference. An Oldham coupling 66 is also provided positioned between orbiting scroll member 56 and bearing housing 24 and keyed to orbiting scroll member 56 and a non-orbiting scroll member 68 to prevent rotational movement of orbiting scroll member 56. Oldham coupling 66 is preferably of the type disclosed in assignee's co-pending U.S. Pat. No. 5,320,506, the disclosure of which is hereby incorporated herein by reference.

Non-orbiting scroll member 68 is also provided having a wrap 70 positioned in meshing engagement with wrap 58 of orbiting scroll member 56. Non-orbiting scroll member 68 has a centrally disposed discharge passage 72 which communicates with an upwardly open recess 74 which in turn is in fluid communication with a discharge muffler chamber 76 defined by cap 14 and partition 22. An annular recess 78 is also formed in non-orbiting scroll member 68 within which is disposed a seal assembly 80. Recesses 74 and 78 and seal assembly 80 cooperate to define axial pressure biasing chambers which receive pressurized fluid being compressed by wraps 58 and 70 so as to exert an axial biasing force on non-orbiting scroll member 68 to thereby urge the tips of respective wraps 58, 70 into sealing engagement with the opposed end plate surfaces. Thrust bearing surface 54 provides a reaction point for the axial biasing force exerted on non-orbiting scroll member 68. Seal assembly 80 is preferably of the type described in greater detail in U.S. Pat. No. 5,156,539, the disclosure of which is hereby incorporated herein by reference. Non-orbiting scroll member 68 is designed to be mounted to bearing housing 24 in a suitable manner such as disclosed in the aforementioned U.S. Pat. No. 4,877,382 or U.S. Pat. No. 5,102,316, the disclosure of which is hereby incorporated herein by reference.

Referring now to FIGS. 2 through 5, main bearing housing 24 includes a central housing 100 and a plurality of radially extending legs 102. Central housing 100 includes a lower annular portion 104, a middle annular portion 106 and an upper annular portion 108. Lower annular portion 104 defines a machined bore 110 within which bearing 34 is located. One of the concerns during the machining of bearing housing 24 is the distortion of bore 110 due to damping pressures when lower annular portion 104 is utilized for holding main bearing housing 24 during machining. Distortion of bore 110 will lead to problems with its durability. The exterior surface of lower portion 104 does not require machining because it is a non-functional surface with the only consideration being clearance for upper counter weight 50.

Middle annular portion 106 defines a machined bore 112 within which the hub of orbiting scroll 56 orbits. An annular machined surface 114 is formed by the step between bore 110 and bore 112. Middle annular portion 106 also defines a radially extending machined bore 116 which acts as a return lubricant passage for lubricant which collects within bore 112. The exterior surface of middle annular portion 106 also does not have to be machined because it is also a non-functional surface. An exterior annular non-machined surface 118 is formed by the step between lower annular portion 104 and middle annular portion 106.

Upper annular portion 108 includes machined extension of machined bore 112 and defines machined thrust bearing surface 54. An upper external surface 120 of upper annular portion 108 which is adjacent to surface 54 is machined as well as an annular machined surface 122 which extends radially from machined portion 120 and an upper internal surface 124 which extend upward from surface 122. Surface 122 extends radially from portion 120 onto each of the plurality of legs 102 and is used for supporting Oldham coupling 66. The diameter of upper surface 122 is sized by surface 124 to provide clearance for Oldham coupling 66.

Each of the plurality of legs 102 extend radially from central housing 100 and are attached to shell 12 to secure main bearing housing 24 to shell 12. Each of the plurality of legs 102 includes a generally horizontal section 126 which extends radially from upper portion 108 and a generally vertical or axially extending rib section 128 which extends radially from middle annular portion 106. Sections 126 and 128 mate with a curved flange section 130. The upper surface of generally horizontal section 126 is machined to produce surface 122 which supports Oldham coupling 66. An exterior surface 132 of flange section 128 of each leg 102 is machined to mate with the interior surface of shell 12. The plurality of surfaces 132 are machined to form a diameter which is slightly larger than the internal diameter of shell 12 to provide a press fit between main bearing housing 24 and shell 12. Each flange section 128 defines a radially extending machined bore 134 which is used to receive a staked section of shell 12 for retaining main bearing housing 24 within shell 12. The details regarding this staking feature are shown in assignee's U.S. Pat. No. 5,267,844 the disclosure of which is hereby incorporated herein by reference. An upper surface 136 of each flange section 130 is machined to provide a mounting surface for mounting non-orbiting scroll member 68 in the manner disclosed in aforementioned U.S. Pat. No. 4,877,382 or aforementioned U.S. Pat. No. 5,102,316. A threaded bore 138 extends through each flange section 128 to facilitate the mountings of non-orbiting scroll member 68. Two opposing threaded bores 138 are used as datum points during the assembly of compressor 10. Locating pins are assembled to these two opposing bores 138. These locating pins are then used to assemble the remaining components of compressor 10 which are secured in place by using the remaining two threaded bores 138. The locating pins 138 are then removed and the remaining two bolts are assembled. By completing all of the required machining of main bearing housing 24 in one set up, the accuracy of the finished compressor 10 is maximized.

The machining of main bearing housing 24 requires the machining of bore 110, annular surface 114 and bore 112 to complete the interior machining. The exterior machining is accomplished by machining surface 54, upper surface 120, surface 122, surface 132 and surface 136. Finally, bore 116, bores 134 and threaded bores 138 are machined to complete the required machining for main bearing housing 24. The entire machining operation can be accomplished by locating main bearing housing 24 axially within a chuck 200 using annular non-machined surface 118 as an axial stop or locating surface for chuck 200. Chuck 200 includes at least two jaws which each crimp a respective vertical rib section 126 of a respective leg 102. Once located and crimped within chuck 200, accessibility is provided to perform all the necessary machining operations including the drilling of bores 116, 134 and 138 as well as the tapping of bore 138. Vertical rib section 126 adjacent to bore 116 is purposely avoided as a clamping section in order to allow access to the area of middle annular portion 106 where bore 116 is to be located.

Referring now to FIGS. 6–8, chuck 200 comprises a main body 202, a single fixed jaw 204, three movable jaws 206 and a locating assembly 208. Main body 202 is adapted to be secured to the machine tool which is responsible for completing the machining of main bearing housing 24. Jaws 204, jaws 206 and assembly 208 are all assembled to main body 202.

Fixed jaw 204 is fixedly secured to main body 202. Movable jaws 206 are secured to main body 202 within groove 210 such that they are slidable within groove 210 towards and away from the center of chuck 200. Movable jaws 206 are movable between a closed position and an open position in the direction shown by the arrows in FIG. 6. In the closed position, one movable jaw 206 is biased towards fixed jaw 204 to engage a respective vertical rib section 126 of bearing housing 24 to clamp rib section 126 between jaws 204 and 206. The opposing pairs of movable jaws 206 are biased towards each other to engage a respective rib section 126 which is diametrically opposite rib section 126 clamped against fixed jaw 204. In the open position, each movable jaw 206 is biased away from the centerline of chuck 200 to release the respective rib section 126 of bearing housing 24 to allow the removal of the finish machine bearing housing 24 and the installation of a pre-machined blank or casting for bearing housing 24. By clamping only on vertical rib section 126 of bearing housing 24, a non-critical surface, chuck 200 is avoiding and thus eliminating any distortion in bearing housing 24 caused by the clamping load. Typical distortion which could be a problem would be the clamping of lower annular portion 104 or the clamping of middle annular portion 106 which could cause the distorting of machined bore 110 once the clamping load is released. Because bore 110 is used to support bearing 34 and any distortion of bore 110 can lead to durability problem for bearing 34 and thus compressor 10.

An important consideration when machining a pre-machining blank or casting for bearing housing 24 is to accurately locate the central axis of the blank or casting along the center axle of chuck 200. The size of the blank or casting will in part be determined by the amount of misalignment possible between the two axes. A larger amount of misalignment requires a larger amount of machining stock which in turn requires additional material to be removed from the pre-blank or casting. The more material that has to be removed results in additional machining costs as well as additional costs for the pre-blank or casting. Thus, it is advantageous to accurately align the two axes.

Locating assembly 208 has been developed to accurately align the central axis of main bearing housing 24 with the central axis of chuck 200. Referring to FIG. 7, locating assembly 208 comprises a support housing 220 and a centering housing 222. Support housing 220 is a cup shaped housing which is secured within a bore 224 defined by main body 202 by a plurality of bolts or by other means known in the art. Support housing 220 defines a locating surface 226 which engages surface 118 of main bearing housing 24. Locating surface 226 is located on three elevated pads 228. The engagement between surfaces 118 and 226 axially position main bearing housing 24 within chuck 200.

Centering housing 222 is slidingly received within a bore 230 defined by support housing 220. Centering housing 222 is retained within bore 230 by a bolt 232. Bolt 232 also allows and defines the limit for axial movement of centering housing 222 within bore 230. Axial movement of centering housing 222 is controlled by a plurality of guide pins 234 and a plurality of springs 236 urging centering housing 222 away from support housing 220 or to the right as shown in FIG. 7. Centering housing 222 defines a plurality of ramped surfaces 238 which extend radially with respect to the axis of chuck 200. In the preferred embodiment, there are six ramped surfaces 238. Ramped surfaces 238 are adapted to engage the end of lower annular portion 104 of bearing housing 24 and thus center bearing housing 24 within chuck 200 or align the central axis of bearing housing 24 with the central axis of chuck 200. Thus, when inserting a machine blank or casting for bearing housing 24 within chuck 200, the end of lower annular portion 104 engages ramped surfaces 238 and centering housing 222 is urged axially into bore 230 against the load exerted by springs 236 until surface 118 engages surface 226. The load which is exerted by springs 236 produce a load between surfaces 118 and 226 which operate to center bearing housing 24 within chuck 200. Once surface 118 of bearing housing 24 is seated against locating surface 226, movable jaws 206 are actuated to clamp rib section 126 and retain main bearing housing 24 within chuck 200.

Figure 9:
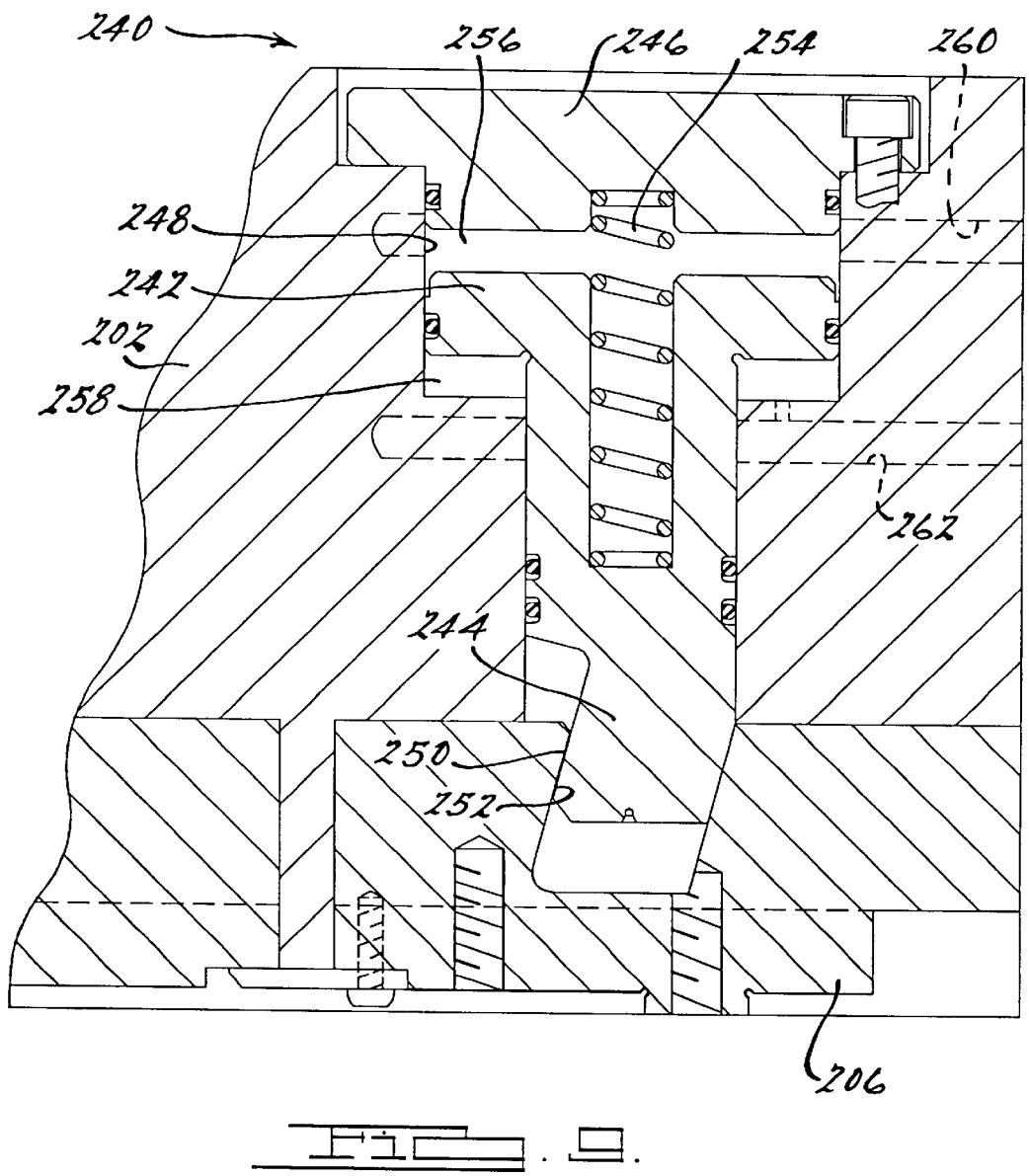
FIG. 9 is a cross-sectional view of the clamp actuating system for the clamping mechanism shown in FIG. 6.

Referring now to FIG. 9, the actuation of each movable jaw 206 is accomplished using a fluid pressure actuator 240. Actuator 240 comprises a piston 242, an actuating cam 244 and an end cap 246. Piston 242 is slidably disposed within a bore 248 defined by main body 202. Actuating cam 244 is integral with piston 242 and extends through bore 248 to engage movable jaw 206. A ramped surface 250 on cam 244 engages a ramped surface 252 on movable jaw 206. End cap 246 is secured to the open end of bore 248. A spring 254 is located between end cap 246 and piston 242 to bias piston 242 away from end cap 246. Piston 242 divides bore 248 into an upper or retraction chamber 256 and a lower or engagement chamber 258. A retraction port 260 provides access to retraction chamber 256 and an engagement port 262 provides access to engagement chamber 258. Thus, when movable jaw 206 is in its open or retracted position, it can be moved to its closed or engaged position by providing pressurized fluid to chamber 258 through port 262. The pressurized fluid causes piston 242 and cam 244 to move away from movable jaw 206. The engagement between ramped surfaces 250 and 252 will force movable jaw 206 towards the centerline of chuck 200. When it is desired to move movable jaw 206 from its closed or engaged position to its open or retracted position, pressurized fluid is provided to chamber 256 through port 260. The pressurized fluid causes piston 242 and cam 244 to move towards movable jaw 206. The engagement between ramped surfaces 250 and 252 will force movable jaw 206 away from the centerline of chuck 200. Spring 254 biases piston 242 and cam 244 towards movable jaw 206 such that in the absence of fluid pressure, clamping jaw 206 is biased to its open or retracted position.

Thus, when positioning a machining blank or casting for main bearing housing 24, it is positioned against fixed jaw 204 and within locating assembly 208 to align the center of the blank with the center of chuck 200. The movable jaw 206 opposite to fixed jaw 204 is actuated to initially hold and locate the blank. The two opposing movable jaws 206 are then actuated to secure the blank within chuck 200 without affecting the alignment of the centerlines.

Jaw 204 and 206 clamp two diametrically opposed rib sections 126 of legs 102 and surface 226 of chuck 200 supports surface 118 of main bearing housing 24. Main bearing housing 24 has four legs 102 and thus two legs 102 are supported by jaws 204 and 206 and two legs 102 are unsupported. During the machining of surfaces 122, 130 and 134 and the machining of bores 132 and 136 deflection of the unsupported legs 120 may occur. Should this deflection occur, the accuracy for machined bearing housing 24 would be adversely affected. Referring to FIG. 10, chuck 200 further comprises a pair of support assemblies 270 which are designed to provide support for legs 102 which are not grasped by jaws 204 and 206. Each support assembly 270 comprises a housing 272, a support pin 274 and an actuating pin 276. Housing 272 is disposed within a cavity 280 defined by main body 202 of chuck 200. Housing 272 defines a first bore 282 which extends out of housing 272 generally parallel to the central axis of chuck 200 and a second bore 284 which meets with first bore 282 and extends generally perpendicular to first bore 282 and the central axis of chuck 200.

Support pin 274 is slidingly received within a guide 286 which is disposed within first bore 282. Support pin 274 includes a ramped surface 288 at the end located within second bore 284 and a support surface 290 located at its opposite end. Actuating pin 276 is slidingly received within second bore 284 and it includes a ramped surface 292 which engages ramped surface 288 of support pin 274. Axial movement of actuating pin 276 within second bore 284 causes axial movement of support pin 274 due to the engagement of ramped surfaces 288 and 292. A coil spring 294 urges actuating pin 276 in the direction to move support pin 274 into engagement with a respective leg 102. A fluid port 296 provides access to the end of second bore 284. At the time of release of moving jaws 206, pressurized fluid is supplied to second bore 284 through port 296 in order to move actuating pin 276 against the biasing of spring 294. This movement of pin 276 allows for the retraction of support pin 274 during installation of a machine blank. When moving jaws 206 are moved to their closed position, pressurized fluid is released from second bore 284 through port 296. Spring 294 will then urge actuating pin 276 in the direction to move support pin 274 into engagement with its respective leg 102.

The advantages for the single locating system for all machining of main bearing housing 24 include but are not limited to 1) simplification of machine set-ups resulting in lower costs; 2) reduction of machining operations resulting in lower costs; and 3) increase in component quality due to the elimination of dimensional stack-ups because all machining is accomplished using the same locating positions at the same time.

While the above detailed description describes the preferred embodiment of the present invention, it should be understood that the present invention is susceptible to modification, variation and alteration without deviatng from the scope and fair meaning of the subjoined claims.

What is claimed is:

1. A method of machining a bearing housing for a compressor, said method comprising the steps of:

locating a bearing housing blank axially within a chuck;

clamping said bearing housing blank in said chuck without circumferentially clamping said bearing housing blank;

performing all machining operations on said bearing housing blank while clamping said bearing housing blank in said chuck to produce said bearing housing.

2. The method according to claim 1 wherein said locating step includes abutting a locating member of said chuck with a locating surface on said bearing housing blank.

3. The method according to claim 2 wherein said clamping step includes having said chuck clamp a radially extending section of said bearing housing blank.

4. The method according to claim 2 wherein said bearing housing blank includes a plurality of radially extending legs having an axially extending section and said clamping step includes having said chuck clamp said axially extending section.

5. The method according to claim 2 further comprising the step of centering said bearing housing blank within said chuck.

6. The method according to claim 2 wherein said step of clamping said bearing housing blank within said chuck includes clamping a first pair of radially extending sections of said bearing housing blank.

7. The method according to claim 6 further comprising the step of providing support for a second pair of radially extending sections of said bearing housing blank.

8. The method according to claim 1 wherein said clamping step includes having said chuck clamp a radially extending section of said bearing housing blank.

9. The method according to claim 1 wherein said bearing housing blank includes a plurality of radially extending legs having an axially extending section and said clamping step includes having said chuck clamp said axially extending section.

10. The method according to claim 1 further comprising the step of centering said bearing housing blank within said chuck.

11. The method according to claim 1 wherein said step of clamping said bearing housing blank within said chuck includes clamping a first pair of radially extending sections of said bearing housing blank.

12. The method according to claim 11 further comprising the step of providing support for a second pair of radially extending sections of said bearing housing blank.

* * * * *